Feb. 12, 1952      J. E. LUNDBERG      2,585,024
TEMPERATURE COMPENSATED FLOATED GYROSCOPE
Filed Dec. 22, 1949
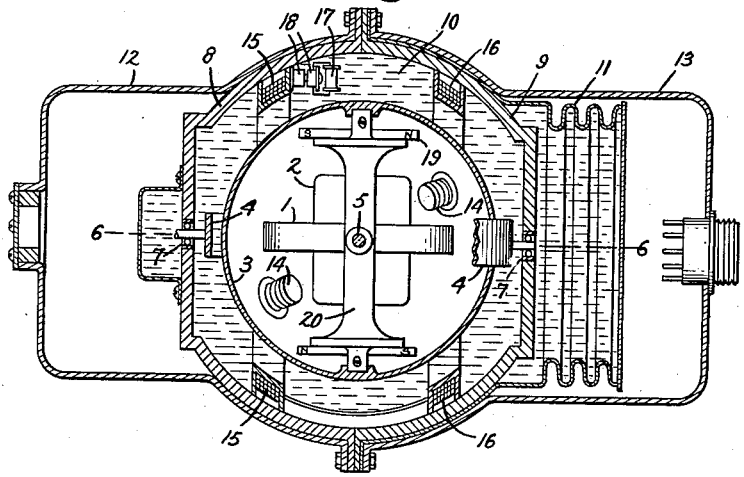
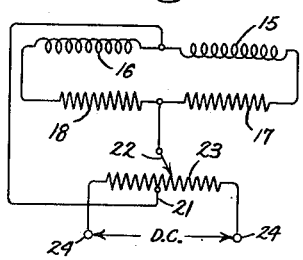
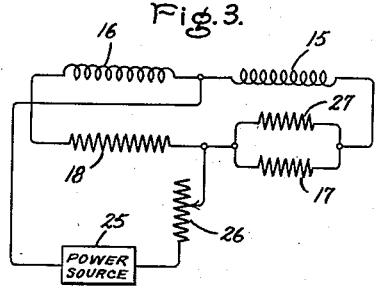
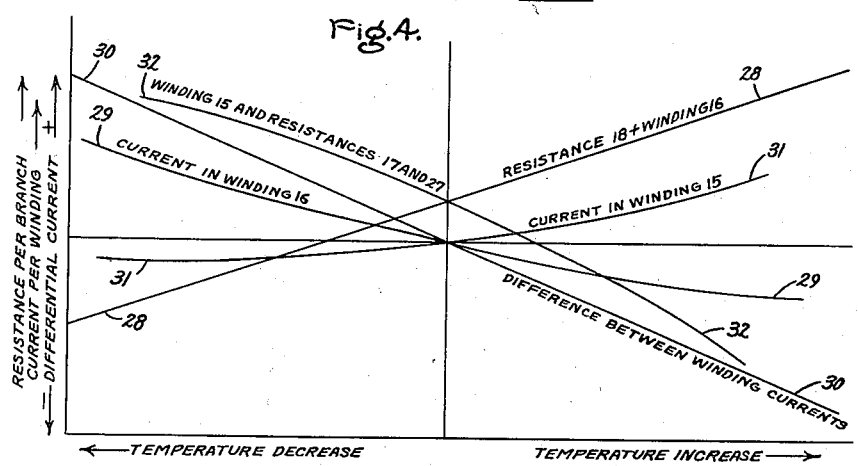
Inventor:
John E. Lundberg,
by Russell A. Wainer
His Attorney.

Patented Feb. 12, 1952

2,585,024

UNITED STATES PATENT OFFICE 2,585,024

TEMPERATURE COMPENSATED FLOATED GYROSCOPE

John E. Lundberg, Lynn, Mass., assignor to General Electric Company, a corporation of New York Application December 22, 1949, Serial No. 134,421

7 Claims. (Cl. 74—5.4)

The present invention relates to temperature compensation systems and more particularly to arrangements for maintaining the proper orientation of a floated gyroscope type instrument with changes in the density of the supporting liquid due to temperature variations.

In the copending application of F. V. Johnson and F. R. Fowler, Serial No. 171,582, filed July 1, 1950, for Floated Gyroscopes, assigned to the same assignee as that of the present application, there is disclosed a highly accurate directional gyroscope instrument wherein the rotor and motive and support means therefor are mounted in a sealed container of such proportions that it will just support itself within a surrounding liquid. This flotation reduces the load along the motor-to-vertical-gimbal axis to a negligible quantity and permits the use of sensitive extremely low-friction bearings such that the precession of the gyroscope due to bearing friction effects is minute. To achieve the high accuracy realizable with a gyro instrument of this type, it is also essential that the unit comprised of the gyro rotor, motive means, and the liquid-tight spherical container for the rotor and motive means be neutrally balanced about its pivot axis. Such neutral balance is accomplished for both the mass and buoyancy of the unit by the bellows balancing structures disclosed in the copending application of J. E. Lundberg and H. G. Swanson, Serial No. 130,118, filed November 30, 1949, for Balancing Means for Floated Gyroscopes, assigned to the same assignee as that of the present application. Since the floated gyroscope is highly sensitive to torques acting thereon, the center of mass and the center of buoyancy of the floated rotor unit must be coincident with the pivot axis thereof for all densities of the supporting liquid, else variations in the liquid temperature, accompanied by changes in the liquid density, will have pronounced and intolerable precessing effects. However, mechanically, the fine adjustment of the positions of the centers of mass and buoyancy to the exact orientations which will satisfy balancing requirements for all temperatures is difficult of attainment. In accordance with the present invention, the unbalance of both mass and buoyancy ensuing from variations in the density of the supporting liquid with temperature fluctuations is compensated automatically by arrangements which apply torques to the floated rotor unit to exactly overcome those torques produced by unbalance effects.

It is therefore one object of the present invention to provide a floated gyroscope instrument wherein the liquid-tight container including the gyro rotor structure is automatically compensated for unbalance about its pivot axis produced by variations in the density of the supporting liquid with temperature changes.

A second object is to provide an entirely automatic system for applying torques to a floated gyroscope rotor structure to exactly neutralize those torques ensuing from changes in the supporting liquid density with temperature fluctuations.

Additionally, it is an object to provide an electrical torque compensator for a floated gyroscope which, responsive to the temperature of the supporting liquid, applies a torque to the gyro rotor structure which maintains the structure in neutral equilibrium about its pivot axis.

These and other objects and features of this invention may be most effectively observed with reference to the following description and the accompanying drawings wherein Fig. 1 is a pictorial view, cut away along a longitudinal axis of a floated gyroscope balanced in accord with the present invention; Figs. 2 and 3 are schematic diagrams of electrical circuits for accomplishing compensation for torques encountered by a floated gyroscope when temperature changes are experienced; and Fig. 4 is a plot of variations in the characteristics of the circuit illustrated in Fig. 3 as a function of the liquid temperature.

The floated gyroscope of Fig. 1, and of the copending application of Johnson et al. noted above includes a gyro rotor 1, and motive means therefor 2, mounted within a spherical shell or container 3 which is liquid-tight and which is pivotally supported by main gimbal 4 through trunnions 5. Universal freedom of movement of sphere 3 is permitted by virtue of its pivoting about trunnions 5 and by virtue of the pivoting of the main gimbal 4 about the major axis 6—6 on bearings 7. The entire structure as thus far described is housed and mounted within the partially spherical liquid-tight enclosure comprised of the two joined sections 8 and 9. That volume intermediate the outer enclosure and those elements internal thereto is completely filled with a liquid 10 which buoys the spherical container 3, the dimensions of the container and the properties of the liquid being selected such that the container just displaces a volume of liquid equivalent to its mass, and the load on the trunnions 5 is reduced to a minute value. Bellows 11 is attached to section 9 and is filled with the liquid 10 which is free to pass between it and the interior of the enclosure of which this section forms a part, whereby expansion and contraction of the liquid is aided by a like effect on the bellows. The additional outer shells 12 and 13, superimposed over sections 8 and 9, respectively, support electrical connection apparatus and physically mount and shield other apparatus associated with the gyroscope and not illustrated in this figure. Attached to the surface of the spherical container 3 are a plurality of bellows balancing units 14 which are adjustable in accordance with the teachings of the copending application of Lundberg et al. mentioned hereinabove, to minimize unbalance of the rotor unit created by buoyancy effects.

It should be apparent that the adjustments of counterweights and the bellows 14 which might satisfactorily serve to maintain zero net torque about the minor axis trunnions 5 when the liquid 10 has a particular density and temperature may not eliminate such torques at other temperatures, and thus other densities of the liquid will produce unbalance. Net torques about the minor axis are, of course, effective to cause precession of the gyroscope about the major gimbal axis 6—6 and may thereby introduce errors which reduce the accuracy of the floated gyro instrument far below those values which it is otherwise capable of producing. It has been found that the gyro rotor structure unbalance, or net torques, resulting from liquid temperature variations in the floated type gyroscope is substantially directly proportional to the temperature, and in accordance with this invention it is possible to minimize these net torques by the automatic application of equal and opposite compensation torques to the liquid-tight rotor structure. Since the undesired torques are proportional to temperature, the compensation torques must likewise bear such a relationship, and in Fig. 1 one embodiment of a system which accomplishes the production of such compensator torques is shown to include two annular coils 15 and 16 attached to the outer enclosure sections 8 and 9 and disposed outside the spherical container 3, resistance units 17 and 18 disposed within the liquid 10, and the permanent magnets 19 affixed to the gyro motor frame 20 within the container 3. As will hereinafter be described in detail, the coils or windings 15 and 16 are energized from an electrical power source to create magnetic fields which interact with the fields of permanent magnets 19 attached to the motor frame, the arrangements thereof being such that no torques will be exerted upon the frame 20 when both windings are either deenergized or carry equal currents, and such that a net torque will be effected about minor axis trunnions 5 in one or the opposite angular direction dependent upon which of the windings 15 and 16 carries the larger current. Resistance units 17 and 18 are coupled with windings 15 and 16 and the power source to automatically control the amount of current flowing in these windings as a function of the liquid temperature.

The circuit diagram of Fig. 2 is representative of the interconnection of elements which may be employed with the compensator structure of Fig. 1. Windings 15 and 16 are shown to be serially connected with resistance units 17 and 18 respectively, these series combinations being paralleled across the variable source of direct current appearing between the fixed tap 21 and the movable tap 22 of the voltage divider winding 23 coupled to the direct current supply represented by the terminals 24. Windings 15 and 16 each have a resistance versus temperature characteristic which is the substantially straight-line, positive slope plot for copper wire, of which these windings may be constructed; resistance 18 is selected to have a similar characteristic, and resistance 17 is made of a material having a zero or negative temperature coefficient of resistance. When at a given temperature of the gyro liquid, such as room temperature, the resistances of the series combinations are equal, the currents through the two windings are equal and with a given voltage applied from across the voltage divider taps there is no resultant torque applied to the gyro rotor structure. As the liquid temperature changes, the resistances of the two series combinations become unbalanced, the fields produced by windings 15 and 16 become unequal and magnets 19 then exert resultant torques upon the rotor structure which may oppose those resultant torques produced by buoyancy unbalances with liquid density changes. Adjustment of voltage divider tap 22 may be accomplished to set up a compensating torque which produces exact rotor structure balance for a desired liquid temperature, and when the resistances 17 and 18 are selected to have appropriate temperature coefficients of resistance the compensated balance is preserved satisfactorily over a wide range of liquid temperature variations.

In Fig. 3 a preferred embodiment of a torque compensator circuit arrangement is illustrated inclusive of windings 15 and 16, a power source 25, rheostat 26, and resistances 17, 18 and 27. Winding 16 is serially connected with resistance 18, and winding 15 is placed in series with the parallel resistances 17 and 27, the two series combinations being paralleled across the voltage source comprised of power source 25 and the series rheostat 26. Resistance 18 possesses a zero or positive temperature coefficient of resistance such that the resistance versus temperature characteristic of the branch comprised of resistance 18 and the winding 16 is the straight-line, positive slope plot 28 in Fig. 4. With a constant voltage applied to this branch of the circuit, the current through winding 16 is not a straight-line characteristic but one having the current versus temperature curvature of plot 29, Fig. 4. In order that the differential of currents flowing in windings 15 and 16 shall have the straight-line characteristic versus temperature designated by plot 30 because the buoyancy unbalance is also a straight-line function of temperature, the current through the branch composed of winding 15 and resistances 17 and 27 must have the current versus temperature characteristic of plot 31. The winding 15 currents of plot 31 may be obtained when the total resistance of the current branch including this winding has the temperature characteristic illustrated in plot 32 of Fig. 4, and when the excitation voltage therefor is maintained constant. A very close approximation of this branch resistance is secured by combining the resistance element 17, which has a negative temperature coefficient of resistance, in parallel with the zero temperature coefficient of resistance element 27 and serially connecting this combination with the winding 15. Thus, the current in one of the windings is different from that in the other in substantially a direct proportion to the temperature of the gyro liquid, and the torque unbalance is compensated accordingly. The rheostat adjustment serves to adjust the magnitude of the current difference and compensating torque required in any instrument, and the polarity of the applied voltage is selected such that the compensation torque is applied in the proper angular direction.

It should be apparent that the present invention is susceptible of modification in numerous ways without departure from the spirit or scope thereof. By way of illustration it is contemplated that the resistance units may be disposed in any convenient position wherein they are responsive to the temperature of the gyro liquid, and these resistances may be distributed, rather than lumped in one position, to be more accurately responsive to the liquid temperature. Additionally, the electro-responsive torque motor system employed to apply compensation torques may be of a construction other than that illustrated and may, for example, be excited from an alternating current source. In a compass-controlled directional gyroscope, the compass-slaving torque motor structure may be adapted to apply the desired compensation torques in accordance with this disclosure.

While particular embodiments of the subject invention have been shown and described herein, these are in the nature of description rather than limitation, and it will occur to those skilled in the art that various changes, modifications and combinations may be made within the province of the appended claims without departing either in spirit or scope from this invention in its broader aspects.

What I claim as new and desire to secure by Letters Patent of the United States is:

1. In combination with a floated gyroscope instrument having a liquid-tight, rotor structure thereof immersed in a liquid, a torque compensator arrangement for maintaining balance of said structure comprising electro-responsive means supported independently of said structure and interacting therewith to apply torques to said structure, said means including two current branches and applying said torques in one and another angular direction depending upon which of said branches carries the larger current, an electrical power source, first resistance means immersed in said liquid to respond to the temperature thereof and having a negative temperature coefficient of resistance, said first resistance means being coupled serially with said source and one of said current branches, and second resistance means immersed in said liquid to respond to the temperature thereof and having a temperature coefficient of resistance other than negative, said second resistance means being coupled serially with said source and the other of said current branches.

2. In combination with a floated gyroscope instrument having a liquid-tight rotor structure immersed in a liquid, a torque compensator for maintaining balance of said structure comprising torque motor means including two current branches and exerting torques upon said structure in angular directions dependent upon which of said current branches carries the larger current, an electrical power source, and two resistance units immersed in said liquid and responsive to the temperature thereof and each coupled serially with said source and one of said current branches, said resistance units having different temperature coefficients of resistance.

3. The combination as set forth in claim 2 wherein one of said resistance units has a negative temperature coefficient of resistance, and wherein the other of said resistance units has a temperature coefficient of resistance other than negative.

4. The combination as set forth in claim 2 wherein one of said resistance units has a temperature coefficient of resistance other than negative, and wherein the other of said resistance units is comprised of the parallel combination of a resistance having a negative temperature coefficient of resistance and a resistance having a temperature coefficient of resistance other than negative.

5. A torque compensator for eliminating net torques about the pivot axis of a liquid-tight structure immersed in a liquid when the temperature of said liquid varies, comprising torque motor means including two current branches and exerting torques upon said structure in angular directions about said pivot axis depending upon which of said current branches carries the larger current, an electrical power source, and two resistance units immersed in said liquid and varying in resistance responsive to the temperature thereof and each coupled serially with said source and one of said current branches, said resistance units having different temperature coefficients of resistance.

6. A floated gyroscope instrument comprising a gyro rotor and motive means therefor, a liquid-tight housing for said rotor and motive means, a main gimbal pivotally supporting said housing and the rotor structure internal thereto, means pivotally supporting said gimbal, an outer liquid-tight enclosure for said instrument, a liquid filling the remaining volume between said housing and said enclosure, permanent magnet means coupled with said housing, two current conducting windings fixedly positioned with respect to said enclosure and disposed to interact magnetically with said magnet means to exert torques upon said housing in angular directions about the pivot axis thereof depending upon which of said windings carries the larger current, an electrical power source, a first resistance unit immersed in said liquid and having a negative temperature coefficient of resistance, said first resistance unit being coupled serially with said source and one of said windings, and a second resistance unit immersed in said liquid and having a temperature coefficient of resistance other than negative, said second resistance unit being coupled serially with said source and the other of said windings.

7. A floated gyroscope instrument as set forth in claim 6 wherein said windings have positive temperature coefficients of resistance, and wherein said first resistance unit comprises a resistance having a negative temperature coefficient of resistance in parallel with a resistance having a temperature coefficient of resistance other than negative, said resistance units being proportioned such that the difference between currents flowing in said windings is in direct proportion to the temperature change in said liquid.

JOHN E. LUNDBERG.

REFERENCES CITED

The following references are of record in the file of this patent:

UNITED STATES PATENTS

| Number | Name | Date |
|---|---|---|
| 1,390,471 | Sundhaussen | Sept. 13, 1921 |
| 1,589,039 | Anschutz-Kaempfe | June 15, 1926 |
| 2,390,532 | Haskins, Jr., et al. | Dec. 11, 1945 |
| 2,412,204 | Carter et al. | Dec. 10, 1946 |